United States Patent
Kurjanowicz et al.

(10) Patent No.: US 11,113,981 B2
(45) Date of Patent: Sep. 7, 2021

(54) SKILL TRAINING SYSTEM

(71) Applicant: ADP, LLC, Roseland, NJ (US)

(72) Inventors: Agatha Kurjanowicz, Ottawa (CA); Scott Crockett, New York, NY (US); Sirui Liu, New York, NY (US); Jesse S. Zolna, Larchmont, NY (US); Michael Thibodeau, Brooklyn, NY (US); Valérie Felger, Fort-de-France (MQ); David Philander Derby, New York, NY (US); Jerome Gouvernel, Brooklyn, NY (US)

(73) Assignee: ADP, LLC, Roseland, NJ (US)

( * ) Notice: Subject to any disclaimer, the term of this patent is extended or adjusted under 35 U.S.C. 154(b) by 92 days.

(21) Appl. No.: 15/054,736

(22) Filed: Feb. 26, 2016

(65) Prior Publication Data
US 2017/0103663 A1  Apr. 13, 2017

Related U.S. Application Data

(60) Provisional application No. 62/240,665, filed on Oct. 13, 2015.

(51) Int. Cl.
*G09B 5/02* (2006.01)
(52) U.S. Cl.
CPC ..................... *G09B 5/02* (2013.01)
(58) Field of Classification Search
CPC .... G06Q 10/06393; G06Q 10/06; G09B 7/02; G09B 5/02
See application file for complete search history.

(56) References Cited

U.S. PATENT DOCUMENTS

| | | | |
|---|---|---|---|
| 6,459,787 B2 * | 10/2002 | McIllwaine | G06Q 10/06398 |
| | | | 379/265.06 |
| 6,735,570 B1 | 5/2004 | Lacy et al. | |
| 7,310,625 B2 | 12/2007 | Wu | |
| 7,444,315 B2 | 10/2008 | Wu | |
| 8,046,307 B2 | 10/2011 | Habichler et al. | |
| 8,086,482 B2 | 12/2011 | Silvera et al. | |
| 8,195,488 B1 | 6/2012 | Taix et al. | |
| 8,204,809 B1 | 6/2012 | Wise | |
| 8,306,839 B2 | 11/2012 | Deich et al. | |
| 8,504,623 B2 | 8/2013 | Santos et al. | |
| 8,527,312 B2 | 9/2013 | Taix et al. | |

(Continued)

FOREIGN PATENT DOCUMENTS

WO    WO2013149198 A1    10/2013

OTHER PUBLICATIONS

EIC 3700 STIC Search Results.*

(Continued)

*Primary Examiner* — Malina D. Blaise
(74) *Attorney, Agent, or Firm* — Yee & Associates, P.C.

(57) ABSTRACT

A computer system comprises a display system and a skill trainer in communication with the display system. The skill trainer receives a submission of content from a user relevant to a particular skill. The skill trainer publishes the content as material relevant to increasing a proficiency in the particular skill. Further, the skill trainer increases the proficiency of the user according to a policy for submission of content relevant to the particular skill, enabling performing an operation for the organization based on the skills for the people in the organization.

27 Claims, 13 Drawing Sheets

(56) References Cited

U.S. PATENT DOCUMENTS

| | | |
|---|---|---|
| 8,700,537 B1 | 4/2014 | Deshpande et al. |
| 2002/0194045 A1 | 12/2002 | Shay et al. |
| 2003/0050797 A1 | 3/2003 | Brandt et al. |
| 2003/0074302 A1 | 4/2003 | Cope |
| 2003/0106039 A1 | 6/2003 | Rosnow et al. |
| 2003/0154232 A1 | 8/2003 | Beringer et al. |
| 2003/0182173 A1* | 9/2003 | D'Elena ......... G06Q 10/063112 705/7.14 |
| 2003/0182178 A1* | 9/2003 | D'Elena ........... G06Q 10/06398 705/7.14 |
| 2003/0229529 A1* | 12/2003 | Mui .................. G06Q 50/2057 705/328 |
| 2004/0030566 A1 | 2/2004 | Brooks |
| 2004/0030992 A1 | 2/2004 | Moisa et al. |
| 2004/0148178 A1 | 7/2004 | Brain |
| 2005/0015291 A1 | 1/2005 | O'Connor |
| 2007/0006126 A1 | 1/2007 | Calkins et al. |
| 2007/0202475 A1 | 8/2007 | Habichler et al. |
| 2007/0203711 A1* | 8/2007 | Nation ...................... G09B 5/00 434/350 |
| 2008/0040206 A1* | 2/2008 | Silvera .................. G06Q 10/00 705/7.42 |
| 2008/0071610 A1* | 3/2008 | Dhillon ............ G06Q 10/06398 705/7.42 |
| 2008/0189163 A1 | 8/2008 | Rosenberg et al. |
| 2009/0051526 A1 | 2/2009 | Spear et al. |
| 2009/0113004 A1 | 4/2009 | Santos et al. |
| 2009/0286217 A1* | 11/2009 | Kobayashi ............. G06Q 10/10 434/350 |
| 2009/0319316 A1 | 12/2009 | Westerfeld et al. |
| 2010/0070883 A1 | 3/2010 | Hamilton, II et al. |
| 2011/0136092 A1* | 6/2011 | Murray .................... G09B 5/00 434/322 |
| 2011/0161139 A1* | 6/2011 | Maheshwari ........ G06Q 10/06 705/7.42 |
| 2011/0289443 A1* | 11/2011 | Heaven ................. G06Q 50/20 715/772 |
| 2011/0307285 A1* | 12/2011 | Kale ..................... G06Q 10/06 705/7.14 |
| 2012/0011239 A1 | 1/2012 | Svane et al. |
| 2012/0239454 A1 | 9/2012 | Taix et al. |
| 2013/0217501 A1 | 8/2013 | Bruno, Jr. et al. |
| 2013/0282419 A1 | 10/2013 | Braddy et al. |
| 2014/0019187 A1 | 1/2014 | Olsen et al. |
| 2014/0096035 A1* | 4/2014 | Hall .......................... G06F 3/01 715/753 |
| 2014/0195295 A1 | 7/2014 | Whitley et al. |
| 2014/0278821 A1 | 9/2014 | McConnell |
| 2014/0324517 A1 | 10/2014 | Harris |
| 2014/0337071 A1 | 11/2014 | Stiffler et al. |
| 2015/0006492 A1* | 1/2015 | Wexler .................. G06F 16/248 707/694 |
| 2015/0039343 A1 | 2/2015 | Cline et al. |
| 2015/0142486 A1* | 5/2015 | Broady .............. G06Q 10/0631 705/7.12 |
| 2015/0169733 A1 | 6/2015 | Motamedi et al. |
| 2015/0220725 A1* | 8/2015 | Strode ..................... G06F 21/31 726/7 |
| 2015/0242815 A1 | 8/2015 | Velasco |
| 2015/0346937 A1* | 12/2015 | Mahmoudian-Bidgoly ................ G06F 3/0484 715/753 |
| 2015/0347950 A1* | 12/2015 | Goyal .............. G06Q 10/06393 705/7.39 |
| 2016/0042654 A1* | 2/2016 | Fieldman ................. G09B 7/00 434/219 |

OTHER PUBLICATIONS

Kurjanowicz et al., "Viral Workstream System," U.S. Appl. No. 15/054,679, filed Feb. 26, 2016, 58 pages.

Kurjanowicz et al., "Achievement Portfolio System," U.S. Appl. No. 15/054,769, filed Feb. 26, 2016, 55 pages.

Final Office Action, dated May 15, 2019, regarding U.S. Appl. No. 15/054,679, 25 pages.

Final Office Action dated Jun. 13, 2019, regarding U.S. Appl. No. 15/054,769, 18 pages.

Office Action dated Jul. 25, 2019, regarding U.S. Appl. No. 15/054,679, 19 pages.

Office Action dated Jan. 11, 2019, regarding U.S. Appl. No. 15/054,769, 17 pages.

Office Action dated Oct. 5, 2018, regarding U.S. Appl. No. 15/054,679, 20 pages.

* cited by examiner

SEARCH... 🔍

< BACK TO TRENDS    Learning Library    702 — EDWARD B ⌄

MY TRAINING   LIBRARY

| PROJECT PLANNING | VISUAL DESIGN | TREND ANALYSIS | TREND FORECASTING | RESEARCH | Locked | Locked | Locked |
|---|---|---|---|---|---|---|---|
| Completed | Completed | Completed | 67% Completed | 43% Completed | | | |
| 706 | 708 | 710 | 712 | | | | |

714

PEOPLE WITH SIMILAR ACCOMPLISHMENTS   704
Learn more about your colleagues

Recommended training for you Worth 25 points towards TREND FORECASTING ✕

TRENDSPOTTING
UserGeneratedContext
See how Jane Harris became a trendspotter Jane Harris Director of Marketing
Minneapolis, MN 15 years experience
4 years at company

NEW CONSUMER INSIGHTS VIDEO

PEOPLE WHO CAN HELP YOU GROW

FIND A MENTOR

Evan Becket Austin, Texas
Sr. Director of Sales at Saviar
Since 2004

View Profile   Download Contact Card   Forward

New Game:
What company Value are you?

FIG. 8

SKILL TRAINING SYSTEM

CROSS-REFERENCE TO RELATED APPLICATIONS

This application claims the benefit of U.S. Provisional Patent Application No. 62/240,665, filed Oct. 13, 2015, and entitled "Skill Training System."

This application is also related to U.S. patent application Ser. No. 15/054,679, Publication No. US-2017-0103352-A1, entitled "Viral Workstream System", and U.S. patent application Ser. No. 15/054,769, Publication No. US-2017-0103354-A1, entitled "Achievement Portfolio System", each of which is filed even date hereof, assigned to the same assignee, and incorporated herein by reference.

BACKGROUND INFORMATION

1. Field

The present disclosure relates generally to an improved computer system and, in particular, to a method and apparatus for accessing information in a computer system. Still more particularly, the present disclosure relates to a method and apparatus for accessing information about people in a computer system.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization. As another example, a research department in the organization may use an information system to store and analyze information to research new products, perform reviews of employees, hire new employees, analyze products, or for other suitable operations.

Currently used information systems include databases. These databases store information about the organization. For example, these databases store information about employees, products, research, product analysis, business plans, and other information about the organization.

The information systems may be used in performing operations for an organization. The operations may include hiring operations and project assignments.

For example, in filling a position in an organization, requirements for the position are identified as part of the process. The position may be filled from within the organization or by hiring someone from outside of the organization.

As another example, in assigning people to projects, various characteristics about the people may be used to identify who is most suited for different projects. The characteristics may include, for example, skills and experience that may be considered to identify people with the skills needed for a project.

When acquiring a new skill or increasing a proficiency in a skill, employees must often search for relevant information within databases and across various networks. Searching one or more information systems may identify information about a particular skill that aids the employees acquiring for increasing a proficiency in that skill. However, current information systems lack capabilities for employees to share relevant information with regard to particular skills. Furthermore, because employees acquiring new skills often lack a requisite knowledge level, information identified by the employee may not be the best source of information for the skill or even relevant to the particular skill.

Therefore, it would be desirable to have a method and apparatus that take into account at least some of the issues discussed above, as well as other possible issues. For example, it would be desirable to have a method and apparatus that overcome a technical problem of associating content for a particular knowledge, skill, or characteristic, that makes training employees for the knowledge, skill, or characteristic more cumbersome and time-consuming than desired.

SUMMARY

An embodiment of the present disclosure provides a method for training skills in an organization. A computer system receives a submission of content from a user relevant to a particular skill. The computer system publishes the content as material relevant to increasing a proficiency in the particular skill. Further, the computer system increases the proficiency of the user according to a policy for submission of content relevant to the particular skill, enabling performing an operation for the organization based on the skills for the people in the organization.

Another embodiment of the present disclosure provides a computer system comprising a display system and a skill trainer in communication with the display system. The skill trainer receives a submission of content from a user relevant to a particular skill. The skill trainer publishes the content as material relevant to increasing a proficiency in the particular skill. Further, the skill trainer increases the proficiency of the user according to a policy for submission of content relevant to the particular skill, enabling performing an operation for the organization based on the skills for the people in the organization.

Yet another embodiment of the present disclosure provides computer program product for training skills in an organization comprising a computer readable storage media, and first program code, second program code, and third program code, fourth program code stored on the computer readable storage media. The first program code receives a submission of content from a user relevant to a particular skill. The second program code publishes the content as material relevant to increasing a proficiency in the particular skill. The third program code increases the proficiency of the user according to a policy for submission of content relevant to the particular skill, enabling performing an operation for the organization based on the skills for the people in the organization.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a graphical user interface for increasing proficiency in a skill in accordance with an illustrative embodiment;

FIG. 8 is an illustration of a graphical user interface for informing a user of an increase in skill proficiency in accordance with an illustrative embodiment;

DETAILED DESCRIPTION

The illustrative embodiments recognize and take into account one or more different considerations. For example, the illustrative embodiments recognize and take into account that an employer may need information about an employee when performing certain operations. The illustrative embodiments also recognize and take into account that searching information systems may be more cumbersome and time-consuming than desirable.

Figure 1:
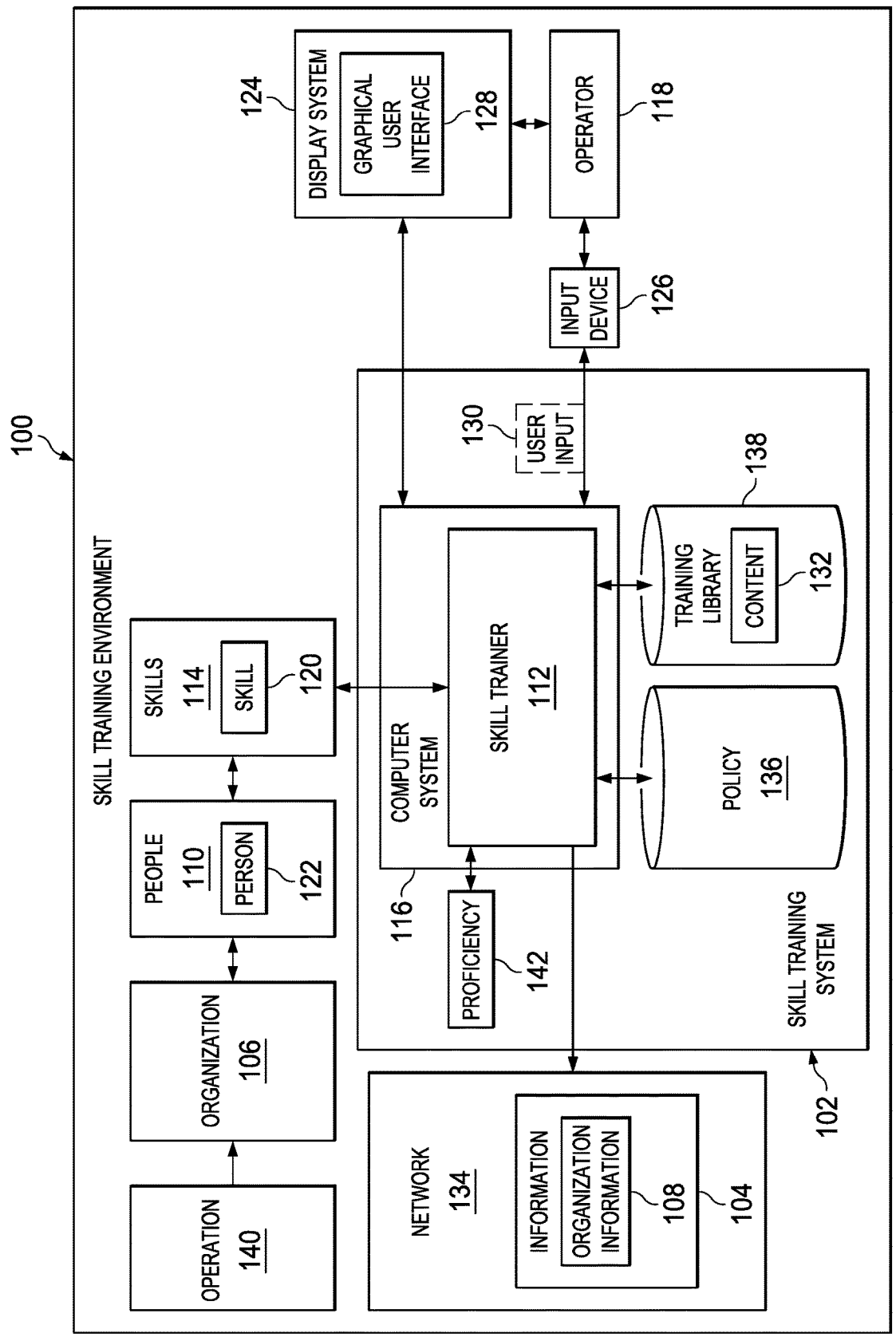
FIG. 1 is an illustration of a block diagram of a skill training environment in accordance with an illustrative embodiment.

With reference now to the figures and, in particular, reference to FIG. 1, an illustration of a block diagram of a skill training environment is depicted in accordance with an illustrative embodiment. In this illustrative example, skill training environment 100 includes skill training system 102. Skill training system 102 provides access to information 104. The portion of information 104 that is specifically for organization 106 is organization information 108. The access of information 104 may be at least one of reading, writing, modifying, storing, or deleting information 104.

Information 104 may be information for at least one of people, products, services, business plans, performance reviews, payroll, human resources, benefits administration, business plans, marketing, research, product development, or other suitable information. As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, organization 106 may be, for example, a corporation, a partnership, a charitable organization, a city, a government agency, or some other suitable type of organization. People 110 may be employees of organization 106. In other illustrative examples, people 110 may be members of organization 106 without being employees of organization 106.

Skill training system 102 provides access to information 104. For example, skill training system 102 may be used for at least one of payroll, benefits administration, product development, marketing, or other suitable purposes in an organization 106.

In one illustrative example, skill trainer 112 may be used to perform at least one of training skills 114, identifying skills 114, or analyzing skills 114 for people 110. As depicted, skill trainer 112 may be implemented in software, hardware, firmware or a combination thereof. When software is used, the operations performed by skill trainer 112 may be implemented in program code configured to run on hardware, such as a processor unit. When firmware is used, the operations performed by skill trainer 112 may be implemented in program code and data and stored in persistent memory to run on a processor unit. When hardware is employed, the hardware may include circuits that operate to perform the operations in skill trainer 112.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, skill trainer 112 may be implemented in computer system 116. A computer system 116 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

In the illustrative example, operator 118 may interact with skill trainer 112 in computer system 116 to access information 104 about skills 114. For example, operator 118 may interact with skill trainer 112 in skill training system 102 to identify information 104 that is useful for increasing a proficiency of skill 120 in person 122.

As depicted, operator 118 may interact with skill trainer 112 using display system 124 and input device 126. Graphical user interface 128 is displayed on display system 124 and provides visualization of information 104 and interaction with skill trainer 112.

As depicted, display system 124 is a hardware system and includes one or more display devices on which graphical user interface 128 may be displayed. The display devices may include at least one of a light emitting diode display (LED), a liquid crystal display (LCD), an organic light emitting diode display (OLED), or some other suitable device on which graphical user interface 128 can be displayed. Operator 118 may interact with graphical user interface 128 through user input 130 generated by input device 126. Input device 126 may be, for example, a mouse, a keyboard, a trackball, a touchscreen, a stylus, or some other suitable type of input device.

In operation, skill trainer 112 in computer system 116 provide a method for training skills 114 of people 110 in organization 106. Skill trainer 112 receives submissions of content 132 identified by operator 118 from information 104 in network 134. Content 132 is information 104 identified by operator 118 that is relevant to training one or more of skills 114 in people 110. Skill trainer 112 stores content 132 in training library 138 for access by people 110 in training skills 114.

Network 134 is located in at least one of skill training system 102 or outside of skill training system 102. For example, network 134 may include at least one of a local area network (LAN), a wide area network (WAN), the Internet, an intranet, or some other suitable type of network.

Skill trainer 112 trains skill 120 for person 122 from content 132 submitted by operator 118 and stored in training library 138. Additionally, skill trainer 112 modifies proficiency 142 of person 122 for skill 120 based on person 122 performing actions with respect to content 132 relevant to skill 120. These actions can be, for example but not limited to, at least one of submitting content 132, accessing content 132, or providing feedback on content 132. When person 122 trains skill 120 from content 132, proficiency 142 of person 122 in skill 120 may be relied upon to perform operation 140 for organization 106 in this illustrative example.

Proficiency 142 is a proficiency level of skill 120 in person 122. In an illustrative embodiment, proficiency 142 is at least one of a value in a range of values, a percentage, or text describing the proficiency level of skill 120 in person 122.

As depicted, the modification of proficiency 142 for operator 118 in skill 120 may be made by receiving submissions of content 132 from operator 118 that identifies information 104 in network 134 relevant to skill 120. Based on receiving submission of content 132 from operator 118, skill trainer 112 modifies proficiency 142 of operator 118 in skill 120 according to policy 136.

In this illustrative example, policy 136 is a group of rules. Policy 136 also may include data used to apply the group of rules. As used herein, the "group of," when used with reference to items, means one or more items. For example, a "group of rules" is one or more rules.

As depicted, the modification of proficiency 142 in skill 120 for person 122 may be made by receiving feedback from person 122 regarding content 132 relevant to skill 120. Based on receiving feedback regarding content 132 from person 122, skill trainer 112 modifies proficiency 142 of person 122 in skill 120 according to policy 136.

As depicted, the modification of proficiency 142 of operator 118 may be made when operator 118 perform actions with respect to content 132 relevant to skill 120. These actions can be, for example but not limited to, at least one of submitting content 132, accessing content 132, or providing feedback on content 132. In other illustrative examples, proficiency 142 of operator 118 may be modified based actions of people 110. For example, proficiency 142 of operator 118 in skill 120 may be modified when people 110 perform actions with respect to operator 118. These actions can be, for example but not limited to, endorsing operator 118 for skill 120. In this example, if people 110 endorse skill 120 for operator 118, skill trainer 112 modifies proficiency 142 in skill 120 of operator 118 based on policy 136.

Additionally, proficiency 142 of operator 118 in skill 120 may be modified when people perform actions with respect to content 132 submitted by operator 118. These actions can be, for example but not limited to, at least one of accessing content 132 submitted by operator 118, or providing feedback on content 132 submitted by operator 118. In this example, if people 110 perform actions with respect to content 132 submitted by operator 118, skill trainer 112 modifies proficiency 142 in skill 120 of operator 118 based on policy 136.

As a result, more certainty is present in performing operation 140 for organization 106 based on proficiency 142 of person 122 in skill 120 when using skill trainer 112. In other words, skill training system 102 measures and modifies proficiency 142 of person 122 in skill 120 based on the application of one or more rules in policy 136 to content 132 submitted by person 122 as well as peer review and feedback from people 110 on content 132 submitted by person 122. In this manner, performing operation 140 for organization 106 is enabled based on proficiency 142 of person 122 in skill 120.

The illustrative example in FIG. 1 and the examples in the other subsequent figures provide one or more technical solutions to overcome a technical problem of associating content for a particular knowledge, skill, or characteristic, that makes training employees for the knowledge, skill, or characteristic more cumbersome and time-consuming than desired. For example, skill trainer 112 modifies proficiency 142 of operator 118 in skill 120 based on policy 136 when operator 118 submits content 132 relevant to skill 120. As another example, skill trainer 112 modifies proficiency 142 person 122 in skill 120 based on policy 136 when person 122 accesses content 132 relevant to skill 120 and provides feedback on content 132 relevant to skill 120.

In this manner, the use of skill trainer 112 has a technical effect of reducing time, effort, or both in training skills 114 in people 110. In this manner, operation 140 performed for organization 106 may be performed more efficiently as compared to currently used systems for training skills 114 in people 110. For example, proficiency 142 may be used in operations selected from at least one of hiring, benefits administration, payroll, performance reviews, forming teams for new products, assigning research projects, or other suitable operations 140 for organization 106.

As a result, computer system 116 operates as a special purpose computer system in which skill trainer 112 in computer system 116 enables training skills 114 for people 110. For example, skill trainer 112 enables training skills 114 based on submission, peer review, and feedback of content 132 according to policy 136.

Thus, skill trainer 112 transforms computer system 116 into a special purpose computer system as compared to currently available general computer systems that do not have skill trainer 112. Currently used general computer systems do not reduce the time or effort needed to increase proficiency 142 in skills 120. Further, currently used general computer systems do not provide for training skill 120 based on submission, peer review, and feedback of content 132 according to policy 136.

Figure 2:
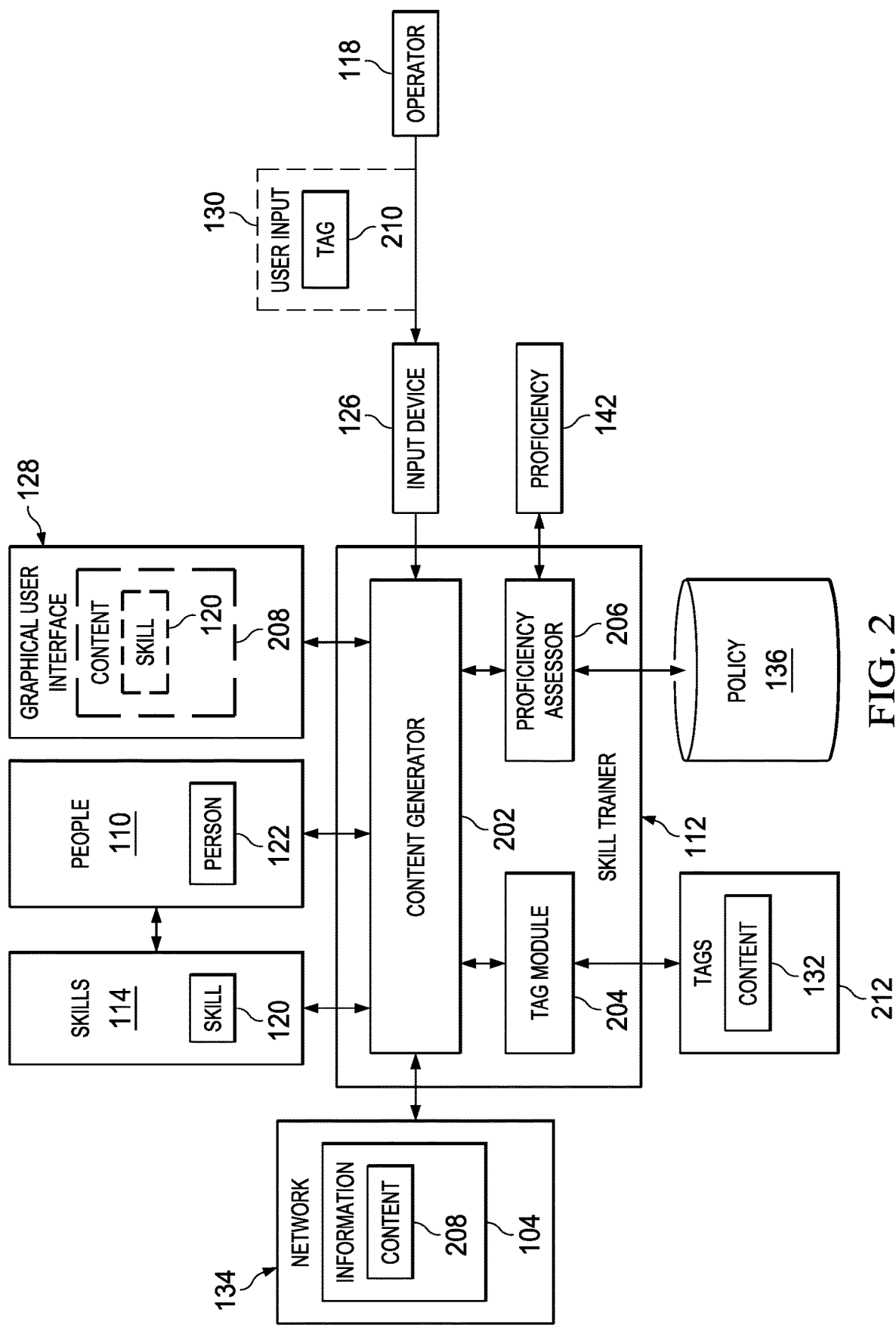
FIG. 2 is an illustration of a block diagram of data flow for submitting content for increasing proficiency in skills in accordance with an illustrative embodiment.

With a reference next to FIG. 2, an illustration of a block diagram of data flow for submitting content for increasing proficiency in skills is depicted in accordance with an illustrative embodiment. In this figure, an example of data flow for submitting content 132 relevant to increasing proficiency 142 of skills 114 in people 110 according to policy 136 through skill trainer 112 is shown. In the illustrative examples, the same reference may be used in more than one figure. This reuse of a reference in different figures represents the second element in the different figures.

As depicted, skill trainer 112 has a number of different components. As used herein, a "number of items" means one or more items. For example, "a number of different components" means one or more components. As depicted, skill trainer 112 includes content generator 202, tag module 204, and proficiency assessor 206.

Content generator 202 in skill trainer 112 accepts submission of content 208 from operator 118. In this illustrative example, content generator 202 includes user-enabled functionality to upload, share, and promote content 208 within skill trainer 112. Content generator 202 associates content 208 with skill 120 of skills 114. By associating content 208 with skill 120, content generator 202 enables increasing proficiency 142 of people 110 in skill 120.

Content 208 is information 104 in network 134 identified by operator 118 that is relevant to increasing proficiency 142 of skill 120 in people 110. As depicted, content 208 can be media information, for example but not limited to, at least one of videos, audio files, or other relevant media. Content 208 can be documentation, such as but not limited to, at least one of PDF files, PPT files, word processor documents and other relevant documentation. Content 208 can be links to external content, such as but not limited to, at least one of uniform resource locator links to publications, videos, podcasts, and other relevant external content. Content 208 can be links to internal content, such as but not limited to, internal content based on company portals of organization 106 shown in FIG. 1.

As depicted, tag module 204 creates tag 210 for content 208 when content generator 202 receives submission of content 208 from operator 118. In an illustrative example, content generator 202 receive submission of content 208 when operator 118 tags content 208 as relevant to increasing proficiency 142 in skill 120. In this example, operator 118 tags content 208 through user input 130 interacting with content 208 displayed in graphical user interface 128 by way of input device 126.

As depicted, tag module 204 creates tag 210 for content 208 when content generator 202 receives submission of content 208 from operator 118. In this illustrative example, tag 210 includes information specifying that content 208 is relevant to increasing proficiency 142 in skill 120. The information in tag 210 also includes at least one of a pointer to content 208, a pointer to feedback regarding content 208, or other suitable types of information for specifying that content 208 is relevant to increasing proficiency 142 in skill 120.

In this illustrative example, tag module 204 adds tag 210 to tags 212. Adding tag 210 to tags 212 adds content 208 to content 132 relevant to skill 120. Tags 212 are data structures which include information about content 132 for skills 114. As depicted, tag 210 includes information about content 208 for skill 120. Tags 212 may be stored in at least one of training library 138 of FIG. 1 or other suitable storage.

As depicted, proficiency assessor 206 modifies proficiency 142 for operator 118 in skill 120 based on receiving submission of content 208 from operator 118. In an illustrative example, proficiency assessor 206 modifies proficiency 142 for operator 118 in skill 120 based on policy 136.

For example, one rule in policy 136 may increase proficiency 142 for operator 118 in skill 120 based on submission of content 208 relevant to skill 120. In this example, proficiency assessor 206 identifies a current level of proficiency 142 for operator 118 in skill 120. Proficiency assessor 206 in increases proficiency 142 for operator 118 in skill 120 by an amount indicated in policy 136. The amount can be, for example at least one of a value in a range of values, a percentage, text describing the proficiency level of skill 120 in operator 118, or other relevant amount.

In this illustrative example, proficiency 142 may be relied on for making decisions on what operations to perform for an organization, such as operation 140 performed for organization 106, both shown in block form in FIG. 1. In this illustrative example, proficiency 142 in skill 120 is modified based on an application of policy 136 to submissions of content 208 by operator 118.

Figure 3:
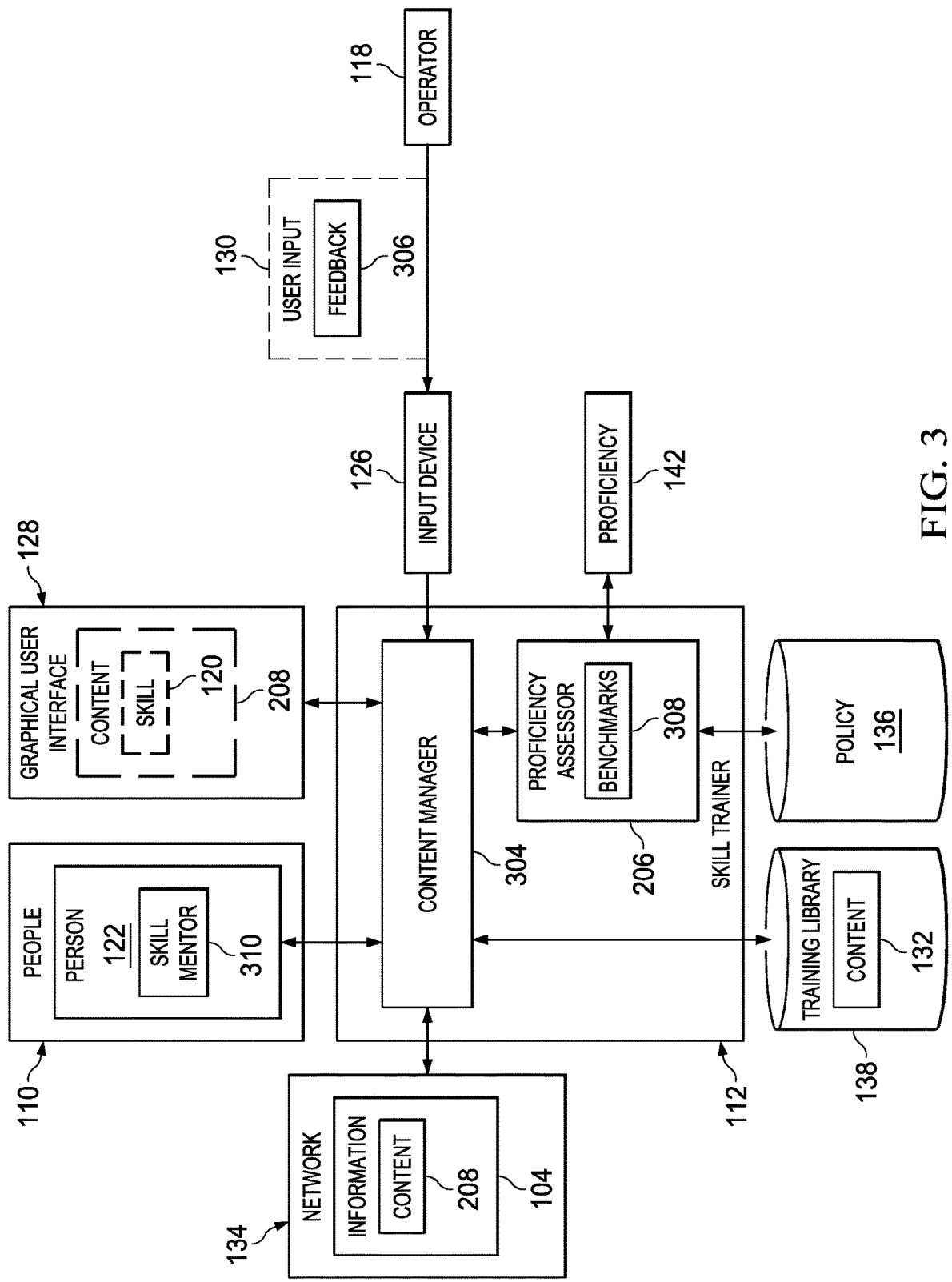
FIG. 3 is an illustration of a block diagram of data flow for providing feedback on content to increase proficiency in related skills in accordance with an illustrative embodiment.

With a reference next to FIG. 3, an illustration of a block diagram of data flow for providing feedback on content to increase proficiency in related skills is depicted in accordance with an illustrative embodiment. In this figure, an example of data flow for submitting feedback 306 relevant to content 208 for increasing proficiency 142 of skill 120 in person 122 according to policy 136 through skill trainer 112 is shown.

As depicted, skill trainer 112 has a number of different components. As depicted, skill trainer 112 includes content manager 304 and proficiency assessor 206.

Content manager 304 in skill trainer 112 accepts feedback 306 from operator 118. In this illustrative example, content manager 304 includes user-enabled functionality to share, discuss, recommend, and promote skill 120 and content 208 within skill trainer 112. In an illustrative embodiment, content manager 304 includes associated groups and discussion forums for skill 120, encouraging conversations and recommendations about content 208. Content manager 304 therefore fosters collaborative discussions among people 110, shown in block form in FIG. 1, within skill trainer 112 about each of the skills 114. In extension, the discussion capabilities provided in content manager 304 enables operator 118 to provide feedback 306 about content 208, and associate feedback 306 with content 208.

Feedback 306 is user input 130 related to content 208. This feedback 306 can include, for example but not limited to, at least one of information about content 208, opinions about content 208, and reactions to content 208. Feedback 306 can take the form of, for example but not limited to, a comment provided by operator 118 in a discussion forum about content 208, a recommendation of content 208 by operator 118, and a promotion of contents 208 by operator 118. In an illustrative example, a promotion of contents 208 can take the form of a "like" or "favorite" of content 208 by operator 118. A promotion of contents 208 can also take the form of a ranking of content 208 by operator 118, such as an indication of 'most useful' for the purpose of increasing proficiency 142.

As depicted, proficiency assessor 206 modifies proficiency 142 for operator 118 in skill 120 based on receiving feedback 306 from operator 118. In an illustrative example, proficiency assessor 206 modifies proficiency 142 for operator 118 in skill 120 based on policy 136.

For example, one rule in policy 136 may increase proficiency 142 for operator 118 in skill 120 based on submission of feedback 306 relevant to content 208. In this example, proficiency assessor 206 identifies a current level of proficiency 142 for operator 118 in skill 120. Proficiency assessor 206 in increases proficiency 142 for operator 118 in skill 120 by an amount indicated in policy 136. The amount can be, for example at least one of a value in a range of values, a percentage, text describing the proficiency level of skill 120 in operator 118, or other relevant amount.

In another of example, content 208 has been previously submitted to skill trainer 112 from person 122. Proficiency assessor 206 modifies proficiency 142 for person 122 in skill 120 based on receiving feedback 306 from operator 118. In an illustrative example, proficiency assessor 206 modifies proficiency 142 for person 122 in skill 120 based on policy 136.

For example, one rule in policy 136 may increase proficiency 142 for operator 118 in skill 120 based on submission of positive feedback 306 regarding content 208. In this example, proficiency assessor 206 identifies a current level of proficiency 142 for person 122 in skill 120. Proficiency assessor 206 in increases proficiency 142 for person 122 in skill 120 by an amount indicated in policy 136. The amount can be, for example at least one of a value in a range of values, a percentage, text describing the proficiency level of skill 120 in person 122, or other relevant amount.

In another example, one rule in policy 136 may decrease proficiency 142 for operator 118 in skill 120 based on submission of negative feedback 306 regarding content 208. In this example, proficiency assessor 206 identifies a current level of proficiency 142 for person 122 in skill 120. Proficiency assessor 206 decreases proficiency 142 for person 122 in skill 120 by an amount indicated in policy 136. The amount can be, for example at least one of a value in a range of values, a percentage, text describing the proficiency level of skill 120 in person 122, or other relevant amount.

As depicted, proficiency assessor 206 includes benchmarks 308. Benchmarks 308 are standards or points of reference against which proficiency 142 may be compared or assessed. In an illustrative example, proficiency assessor 206 compares proficiency 142 for person 122 in skill 120 to benchmarks 308 based on policy 136.

For example, one rule in policy 136 may determine whether proficiency 142 for person 122 in skill 120 exceeds one of benchmarks 308. In this example, proficiency assessor 206 identifies a current level of proficiency 142 for person 122 in skill 120. Proficiency assessor 206 then compares proficiency 142 to benchmarks 308. In an illustrative example, if proficiency 142 exceeds benchmarks 308, content manager 304 can grant at least one of additional rewards or additional privileges to person 122.

As depicted, based on proficiency 142 exceeding benchmarks 308, person 122 has been awarded the designation of skill mentor 310. Skill mentor 310 is a designation that person 122 has achieved a particular level of proficiency in skill 120. By virtue of designation as skill mentor 310 by content manager 304, person 122 is granted additional privileges within skill trainer 112 with regard to the submission of content 208. In this illustrative example, person 122 is granted administrator privileges over portions of content 132 relating to skill 120. In this illustrative example, administrator privileges can include, for example but not limited to, review of content 208, approval of content 208, and deletion of content 208. Additionally, by virtue of designation as skill mentor 310, content 208 submitted from person 122 may not require approval of a different person designated as a skill mentor.

In another illustrative example, by virtue of designation as skill mentor 310 by content manager 304, person 122 is granted additional privileges within skill trainer 112 with regard to feedback 306. For example, one rule in policy 136 may increase proficiency 142 for operator 118 in skill 120 based on submission of positive feedback 306 regarding content 208. However, a second rule in policy 136 may increase proficiency 142 by an additional amount if feedback 306 is received from skill mentor 310.

In this illustrative example, proficiency 142 may be relied on for making decisions on what operations to perform for an organization, such as operation 140 performed for organization 106, both shown in block form in FIG. 1. In this illustrative example, proficiency 142 in skill 120 is modified based on an application of policy 136 to feedback 306 received from operator 118.

Figure 4:
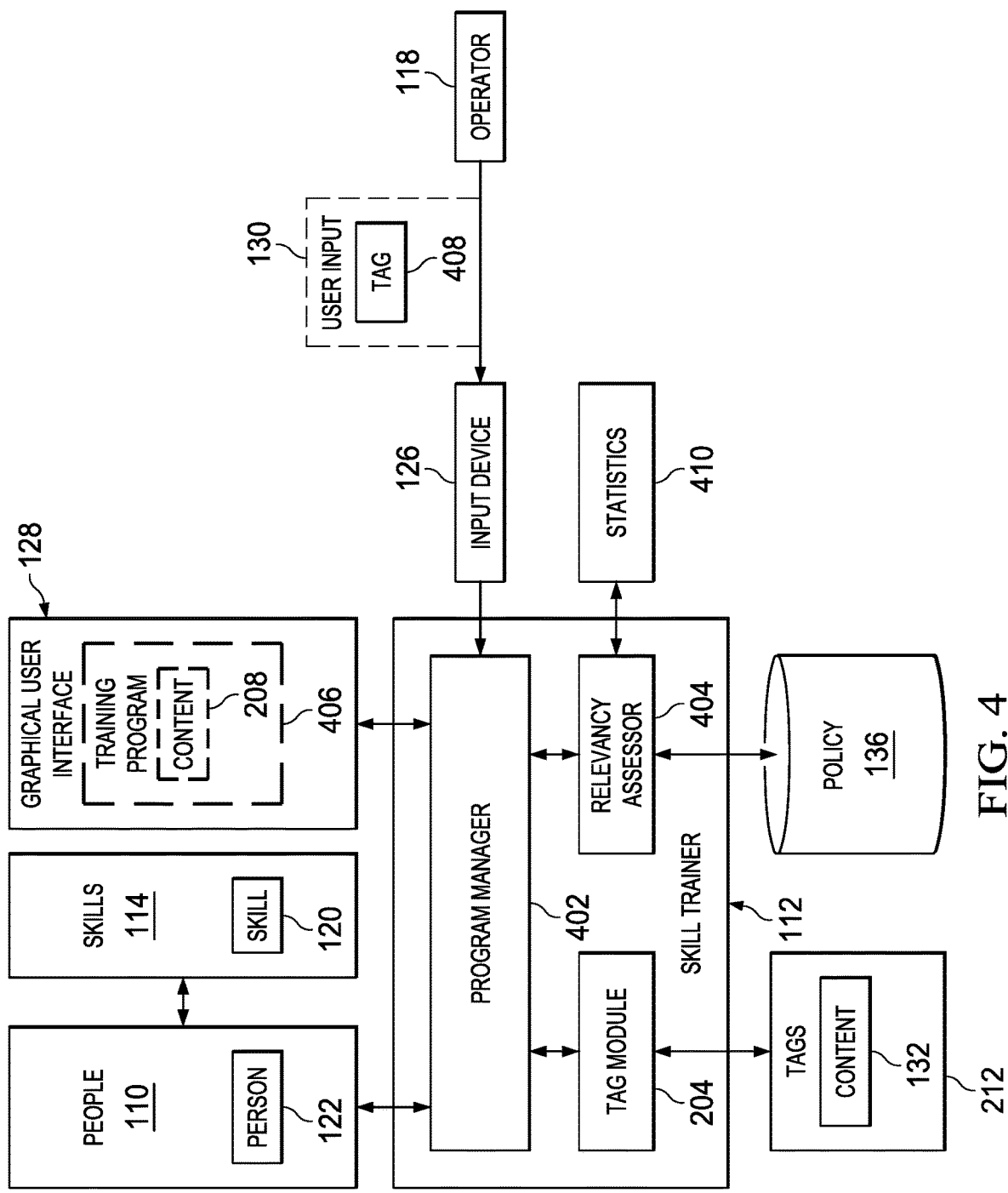
FIG. 4 is an illustration of a block diagram of a data flow for creating a training program to increase a proficiency in skills based on user submitted content within a training library in accordance with an illustrative embodiment.

With reference next to FIG. 4, an illustration of a block diagram of a data flow for creating a training program to increase a proficiency in skills based on user submitted content within a training library is depicted in accordance with an illustrative embodiment. In this figure, an example of a data flow for creating and accessing training program 406 relevant to increasing proficiency 142 in skill 120 through skill trainer 112, shown in block form in FIG. 1, is shown.

As depicted, skill trainer 112 has a number of different components. As depicted, skill trainer 112 includes program manager 402, tag module 204, and relevancy assessor 404.

Program manager 402 in skill trainer 112 enables creation of training program 406 from content 132. Training program 406 is an aggregation of content 132 relevant to at least one of skills 114 or people 110. Program manager 402 in skill trainer 112 enables the creation of training program 406 for, at least one of but not limited to, new hires within a department or team of organization 106 shown in FIG. 1, people 110 having individual interest in various functional areas of organization 106, and formal training programs organized by human resource practitioners for people 110. As depicted, operator 118 has indicated that training program 406 should include content 208.

As depicted, tag module 204 creates tag 408 for content 208 when program manager 402 receives an indication from operator 118 that content 208 should be included in training program 406. In this illustrative example, tag 408 includes information specifying that content 208 is relevant to training program 406 for increasing proficiency 142 in skill 120. The information in tag 408 also includes at least one of a pointer to content 208, a pointer to training program 406, or other suitable types of information for specifying that content 208 is relevant to training program 406 for increasing proficiency 142 in skill 120.

In this illustrative example, tag module 204 adds tag 408 to tags 212. Adding tag 408 to tags 212 associates content 208 with training program 406. As depicted, tag 408 includes information about content 208 for skill 120.

As depicted, relevancy assessor 404 identifies and suggests content 208 for inclusion in training program 406. In an illustrative embodiment, relevancy assessor 404 identifies and suggests content 208 based on an application of policy 136 to statistics 410.

As depicted, relevancy assessor 404 identifies statistics 410 about content 208 about skills 114 of people 110 in organization 106. Statistics 410 are the results of an analysis of content 208. In this illustrative example, the analysis is a mathematical analysis that may identify information about content 208. The information may include, for example, averages, normal distributions, probabilities, and other information.

In an illustrative embodiment, relevancy assessor 404 may identify content based on the application of policy 136 to statistics 410. For example, one rule in policy 136 may identify content 208 based on feedback 306 for content 208, shown in block form in FIG. 3. In this example, relevancy assessor 404 identifies content 208 by adding up numbers of positive feedback for content 208 and endorsements of content 208 received from people 110.

In another example, one rule in policy 136 may identify content 208 based on one or more trends identified for content 208. These trends may be calculated by adding up numbers of people 110 that have endorsed or shared content 208 over a selected time period. The selected time period is at least one of 30 days, 1 month, 1 day, 1 week, 3 months, 1 year, or some other suitable time period for identifying trends. In this example, relevancy assessor 404 identifies content 208 by applying policy 136 to trends identified within statistics 410 for content 208.

Figure 5:
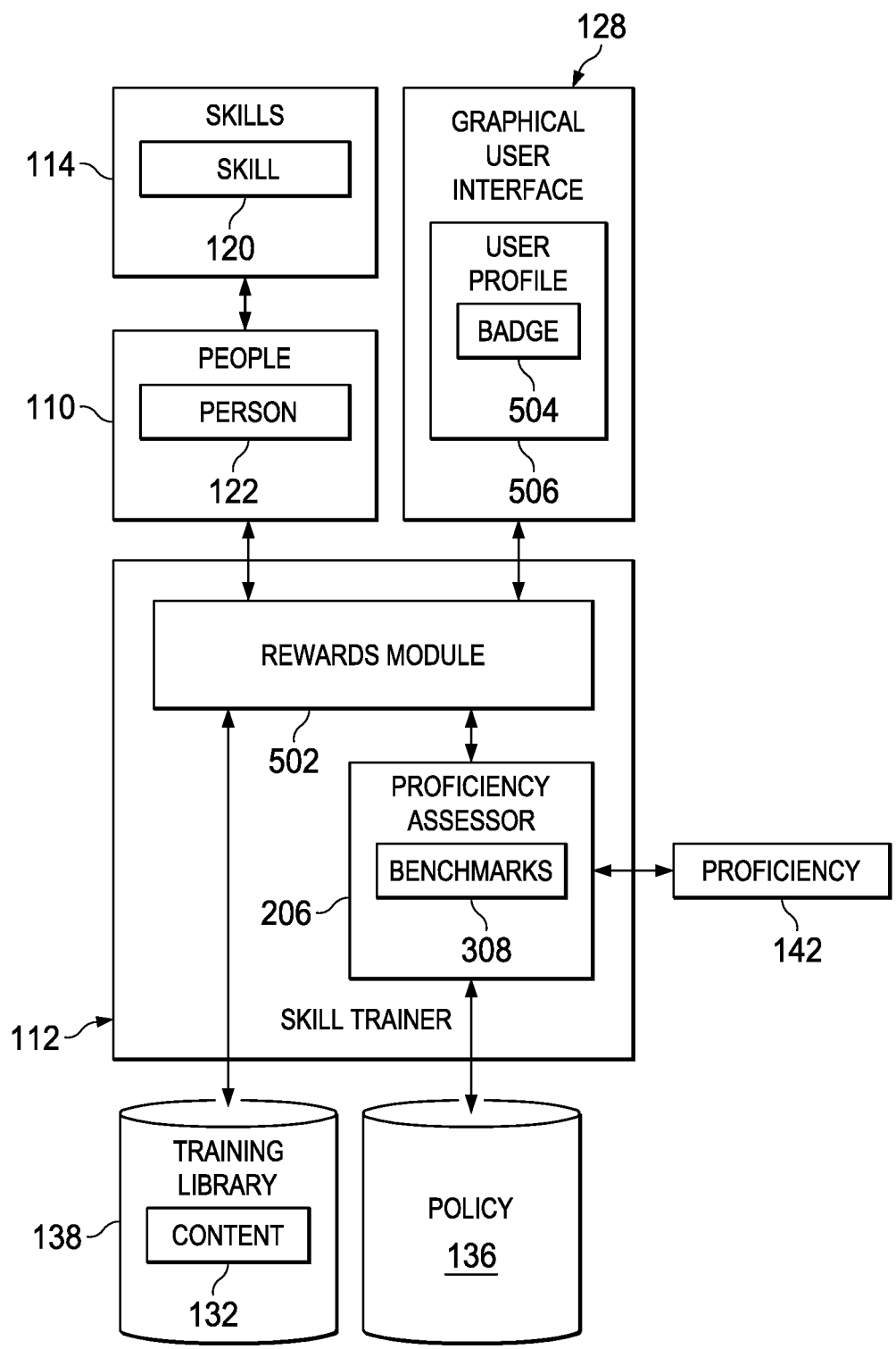
FIG. 5 is an illustration of a block diagram of a data flow for rewarding people for increasing proficiency in skills in accordance with an illustrative embodiment.

With reference next to FIG. 5, an illustration of a block diagram of a data flow for rewarding people for increasing proficiency in skills as depicted in accordance with an illustrative embodiment. In this figure, an example of a data flow for rewarding person 122 for increasing proficiency 142 in skill 120 through skill trainer 112 is shown.

As depicted, skill trainer 112 includes a number of different components. As depicted, skill trainer 112 includes rewards module 502 and proficiency assessor 206.

As depicted, proficiency assessor 206 includes benchmarks 308. Benchmarks 308 are standards or points of reference against which proficiency 142 may be compared or assessed. In an illustrative example, proficiency assessor 206 compares proficiency 142 for person 122 in skill 120 to benchmarks 308 based on policy 136.

For example, one rule in policy 136 may determine whether proficiency 142 for person 122 in skill 120 exceeds one of benchmarks 308. In this example, proficiency assessor 206 identifies a current level of proficiency 142 for person 122 in skill 120. Proficiency assessor 206 then compares proficiency 142 to benchmarks 308. In an illustrative example, if proficiency 142 exceeds benchmarks 308, rewards module 502 can grant rewards to person 122.

As depicted, based on proficiency 142 exceeding benchmarks 308, rewards module 502 displays badge 504 within user profile 506 of person 122. Badge 504 is a graphical element displayed within graphical user interface 128 indicating that person 122 has achieved a particular level of proficiency in skill 120. By virtue of designation as skill mentor 310 by content manager 304 shown in block form in FIG. 3, person 122 is granted additional privileges within skill trainer 112 with regard to the submission of content 208.

Figure 6:
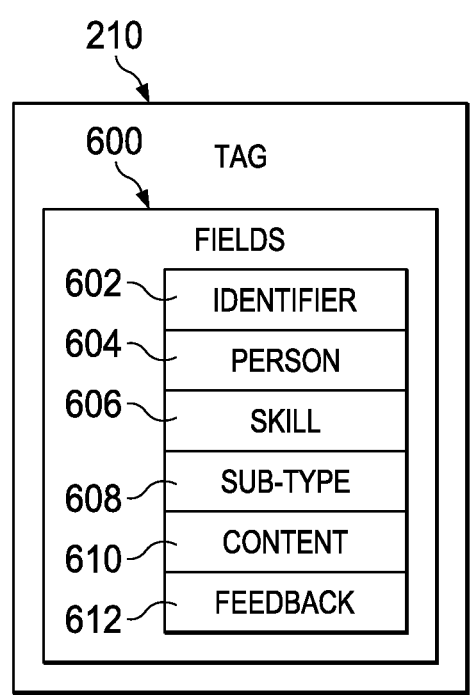
FIG. 6 is an illustration of a block diagram of a tag in accordance with an illustrative embodiment.

Turning to FIG. 6, an illustration of a block diagram of a tag is depicted in accordance with an illustrative embodiment. In this illustration, an illustration of fields 600 that may be in tag 210 is shown.

As depicted, fields 600 in tag 210 include identifier 602, person 604, skill 606, sub-type 608, content 610, and feedback 612. Identifier 602 is a unique identifier for the tag. This unique identifier is selected from at least one of a number, an alpha-numeric string, or any other suitable type of identifier for the tag.

Person 604 is the person identified by the tag as submitting content 208. For example, person 604 may be person 122, depicted in block form in FIG. 1.

Skill 606 is the name of a group of tags 212. Skill 606 can be selected from any knowledge, skill, ability, and other characteristic that can be possessed or exhibited by people 110 and is relevant to their duties and responsibilities to organization 106. Sub-type 608 is the name of a group of tags within skill 606.

Content 610 in tag 210 is where content 208 represented by tag 210 is located within skill training system 102. As depicted, feedback 612 is at least one of feedback 306 submitted regarding content 208 or the location of feedback 306 within skill training system 102.

Figure 8:
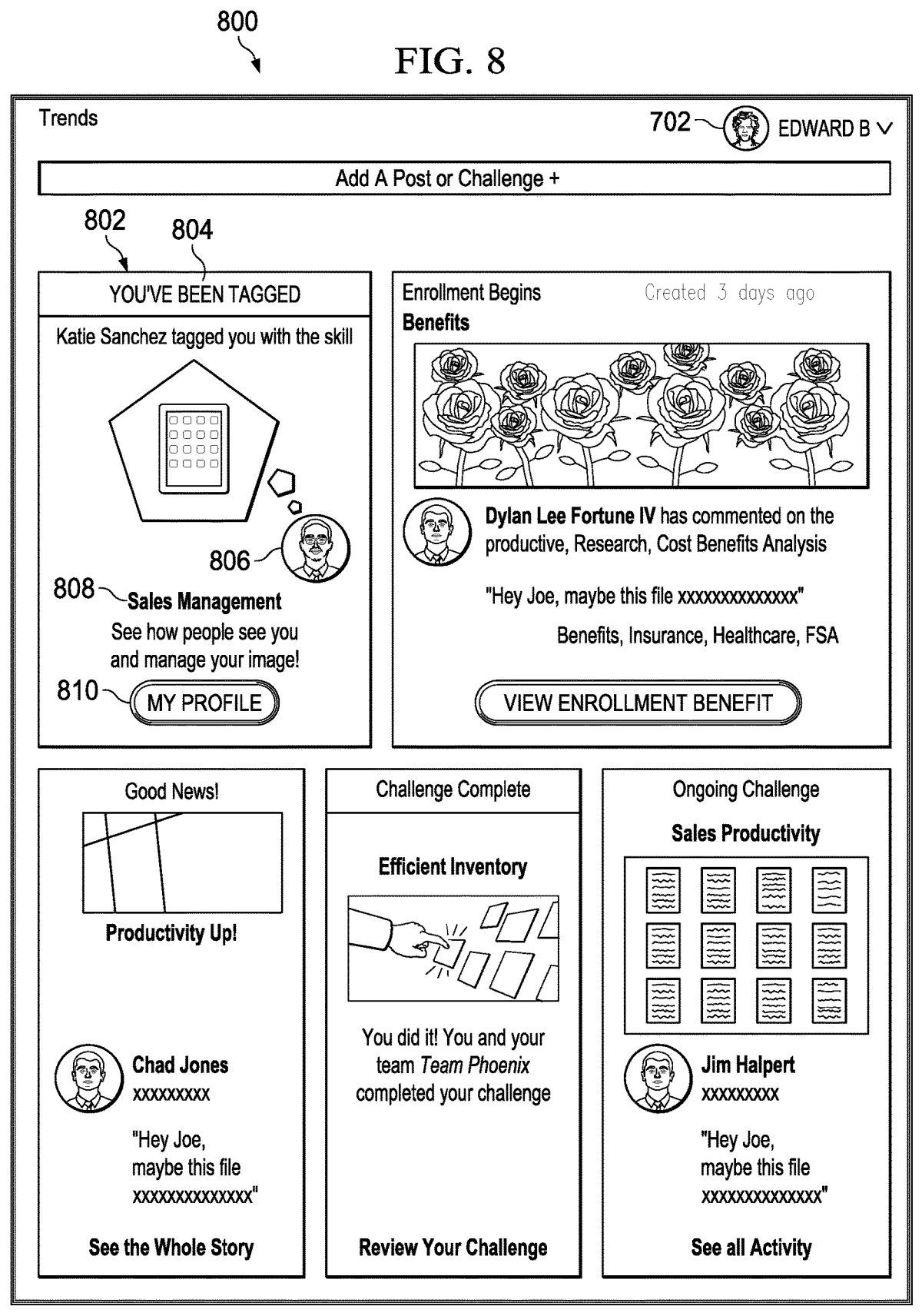
Figure 9:
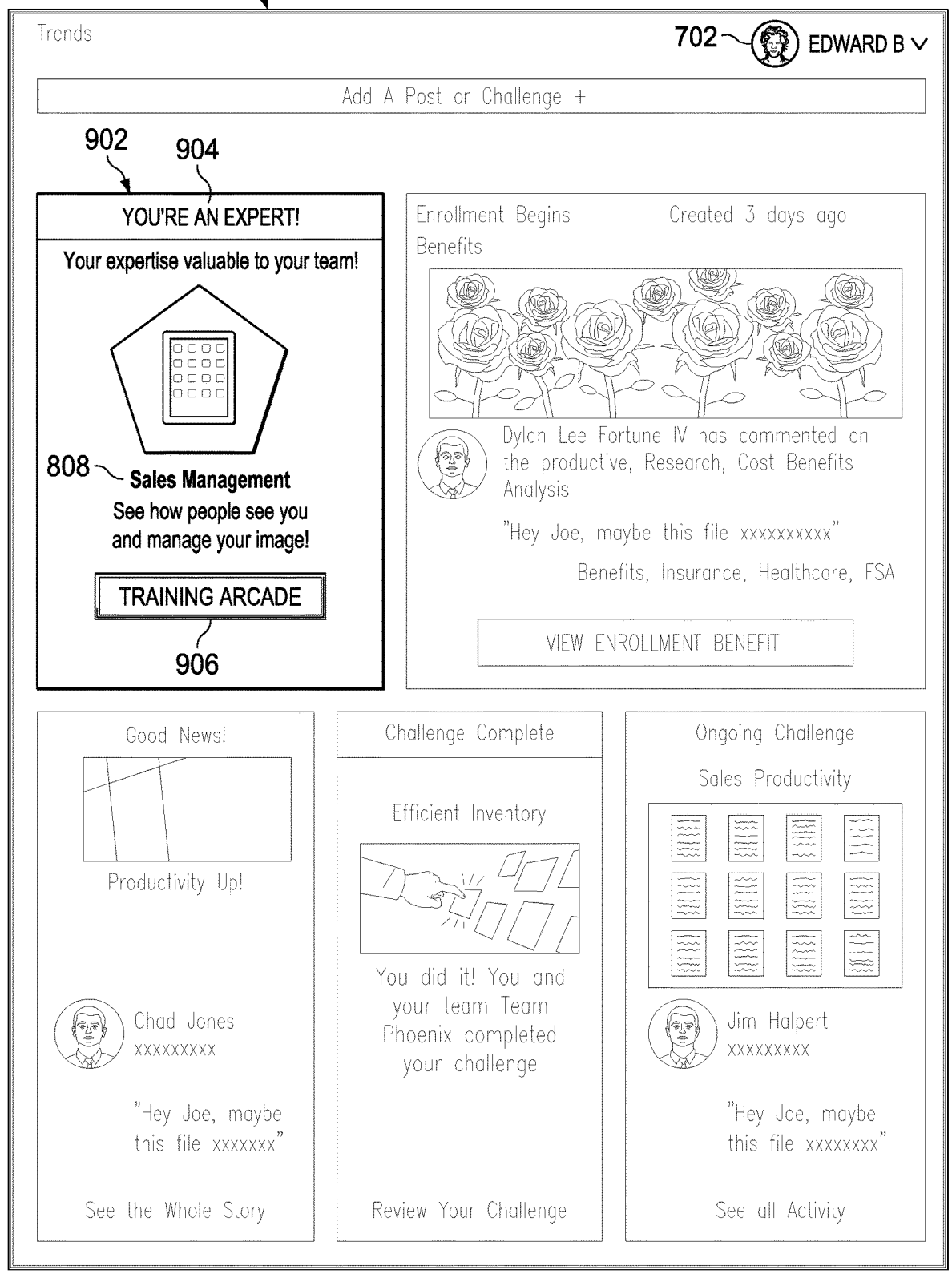
FIG. 9 is an illustration of a graphical user interface for rewarding a user for an increase in proficiency of a skill in accordance with an illustrative embodiment.

FIGS. 7-9 are illustrative examples of a graphical user interface that may be used to access endorsements of skills. With reference first to FIG. 7, an illustration of a graphical user interface for increasing proficiency in skill is depicted in accordance with an illustrative embodiment. As depicted, graphical user interface 700 and is an example of one implementation for graphical user interface 128 shown in block form in FIG. 1.

In this illustrative example, graphical user interface 700 displays a number of different graphical elements. As depicted, graphical user interface 700 includes person 702 and skills 704 for person 702. Person 702 is an example of person 122 shown in block form in FIG. 1.

As depicted, graphical user interface 700 displays an image and a name for person 702. For example, graphical user interface 700 may retrieve the image and the name for person 702 from organization information 108 shown in block form in FIG. 1.

Skills 704 are an example of the group of skills 114 for person 122 shown in block form in FIG. 1. As depicted, skills 704 include project planning 706, visual design 708, trend analysis 710, trend forecasting 712, and research 714.

In this illustrative example, the skills in skills 704 may be selected through user input 130, shown in block form in FIG. 1. By selecting one of skills 704, person 702 can access and submit content relevant to that particular skill. Therefore, by selecting one of skills 704, person 702 can increase his proficiency in the selected skill.

With reference now to FIG. 8, an illustration of a graphical user interface for informing a user of an increase in skill proficiency is depicted in accordance with an illustrative embodiment. As depicted, graphical user interface 800 is an example of one implementation for graphical user interface 128 shown in block form in FIG. 1.

In this illustrative example, graphic user interface 800 displays a number of different graphical elements. As depicted, graphical user interface 800 includes feedback 802.

Feedback 802 is an example of feedback 306, shown in block form in FIG. 3. As depicted, feedback 802 includes feedback type 804, person 806, skill 808, and link 810.

Feedback type 804 indicates a type of feedback received from person 806. As depicted, feedback type 804 is an endorsement of person 702 by person 806 for skill 808.

Person 806 is a person providing feedback 802. Person 806 is an example of person 122, shown in block form in FIG. 1. As depicted, person 806 includes an image and meaning for person 806. For example, graphical user interface 800 may retrieve the image and name for person 806 from organization information 108, shown in block form in FIG. 1.

Skill 808 is an example of skill 120 for person 122 shown in block form in FIG. 1. As depicted, skill 120 is sales management.

Link 810 is interactive button that returns person 702 to graphical user interface 700 shown in FIG. 7. In this example, based on feedback 802 for skill 808, skill 808 can be displayed in skills 704 shown in FIG. 7 for person 702 upon returning to graphical user interface 700 through an interaction with link 810.

With reference now to FIG. 9, an illustration of a graphical user interface for rewarding a user for an increase in proficiency of a skill is depicted in accordance with an illustrative embodiment. As depicted, graphical user interface 900 is an example of one implementation for a graphical user interface 128 is shown in block form in FIG. 1.

In this illustrative example, graphical user interface 900 displays a number of different graphical elements. As depicted, graphical user interface includes badge 902.

Badge 902 is an example of badge 504 is shown in block form in FIG. 5. As depicted, badge 902 includes benchmark 904, skill 808, and solicitation 906.

Benchmark 904 is an example of benchmark 308, shown in block form in FIG. 3. Benchmark 904 identifies the proficiency level of person 702 in skill 808.

Solicitation 906 is an interactive button that facilitates the submission of content 208 by person 702. In this example, interaction with solicitation 906 prompts person 702 for a submission of content 208 relevant to skill 808.

Figure 10:
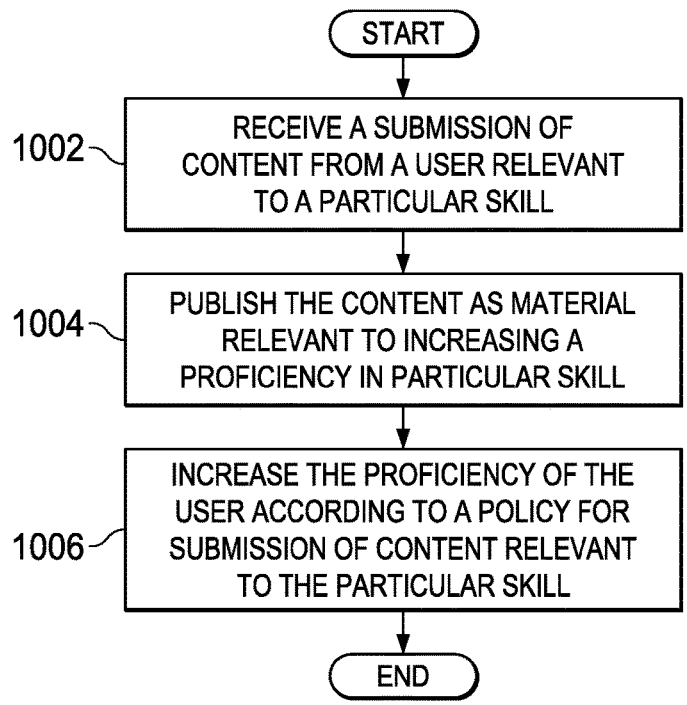
FIG. 10 is an illustration of a flowchart of a process for increasing proficiency in a skill based on submission of content in accordance with an illustrative embodiment.

Turning next to FIG. 10, an illustration of a flowchart of a process for increasing proficiency in a skill based on submission of content is depicted in accordance with an illustrative embodiment. The process illustrated in FIG. 10 may be implemented in skills training environment 100 shown in block form in FIG. 1. This process may be used to enable operations for organization 106. In particular, the process may be implemented in skill trainer 112 in computer system 116. Specifically, the process may be implemented in content generator 202, shown in block form in FIG. 2.

The process begins by receiving a submission of content from a user relevant to a particular skill (step 1002). The process then publishes the content as material relevant to increasing a proficiency in the particular skill (step 1004). The process then increases the proficiency of the user according to a policy for submission of content relevant to the particular skill (step 1006), with the process terminating thereafter. In this manner, performing an action in the organization based on the proficiency of an employee in a particular skill is enabled.

Figure 11:
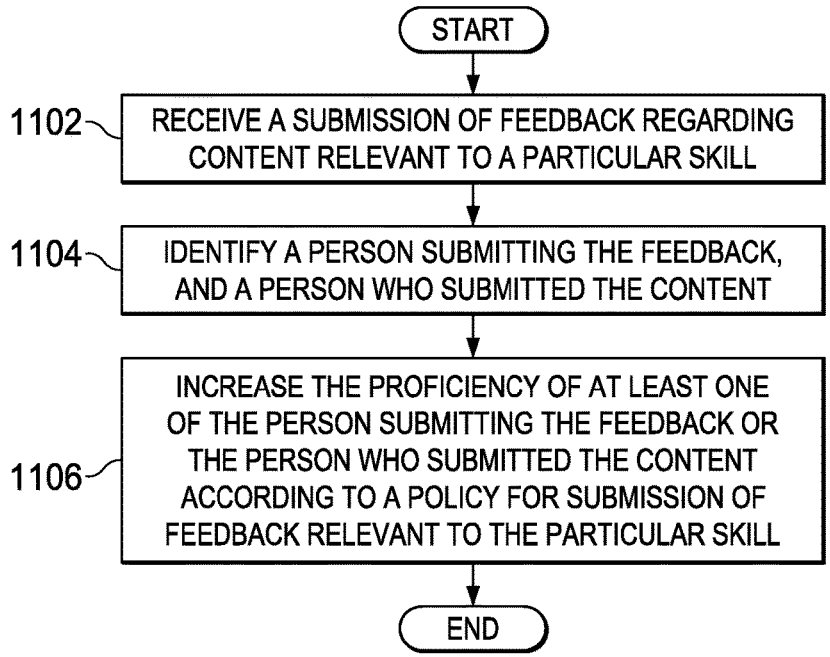
FIG. 11 is an illustration of a flowchart of a process for increasing proficiency in a skill based on submitting feedback on content in accordance with an illustrative embodiment.

Turning now to FIG. 11, an illustration of a flowchart of a process for increasing proficiency in a skill based on submitting feedback on content is depicted in accordance with an illustrative embodiment. The process illustrated in FIG. 11 may be implemented in skill training environment 100 shown in block form in FIG. 1. This process may be used to enable operations for organization 106. In particular, the process may be implemented in skill trainer 112 in computer system 116. Specifically, the process may be implemented in content manager 304, shown in block form in FIG. 3.

The process begins by receiving a submission of feedback regarding content relevant to a particular skill (step 1102). The process then identifies a person submitting the feedback, and a person who submitted the content (step 1104). The process then increases the proficiency of at least one of the person submitting the feedback or the person who submitted the content according to a policy for submission of feedback relevant to the particular skill (step 1106), with the process terminating thereafter. In this manner, performing an action in the organization based on the proficiency of an employee in a particular skill is enabled.

Figure 12:
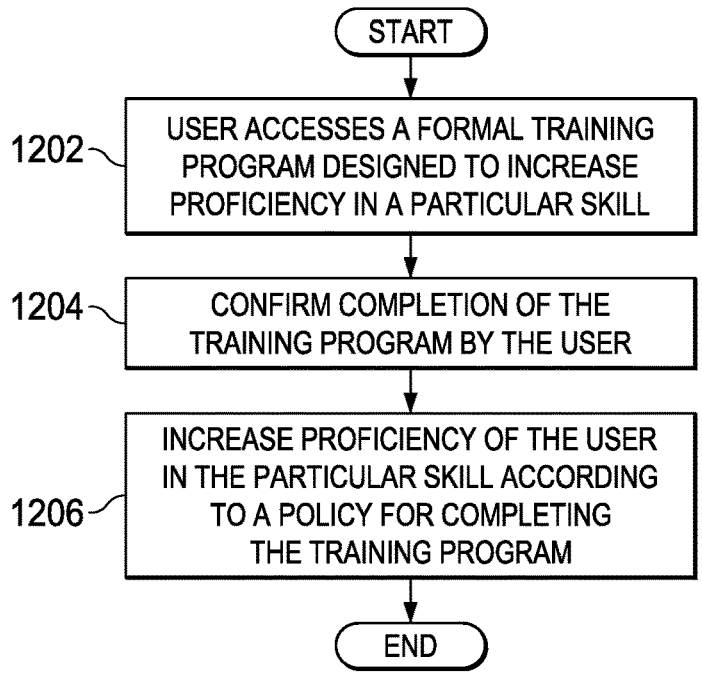
FIG. 12 is an illustration of a flowchart of a process for increasing proficiency in a skill based on completion of a formal training program in accordance with an illustrative embodiment.

Turning now to FIG. 12, an illustration of a flowchart of a process for increasing proficiency in a skill based on completion of a formal training program is depicted in accordance with an illustrative embodiment. The process illustrated in FIG. 12 may be implemented in skill training environment 100 shown in block form in FIG. 1. This process may be used to enable operations 140. In particular, the process may be implemented in skill trainer 112 in computer system 116. Specifically, the process may be implemented in program manager 402, shown in block form in FIG. 4.

The process begins when a user accesses a formal training program designed to increase proficiency in a particular skill (step 1202). The process then confirms completion of the training program by the user (step 1204). The process then increases the proficiency of the user in the particular skill according to a policy for completing the training program (step 1206), with the process terminating thereafter. In this manner, performing an action in the organization based on the proficiency of an employee in the particular skill is enabled.

Figure 13:
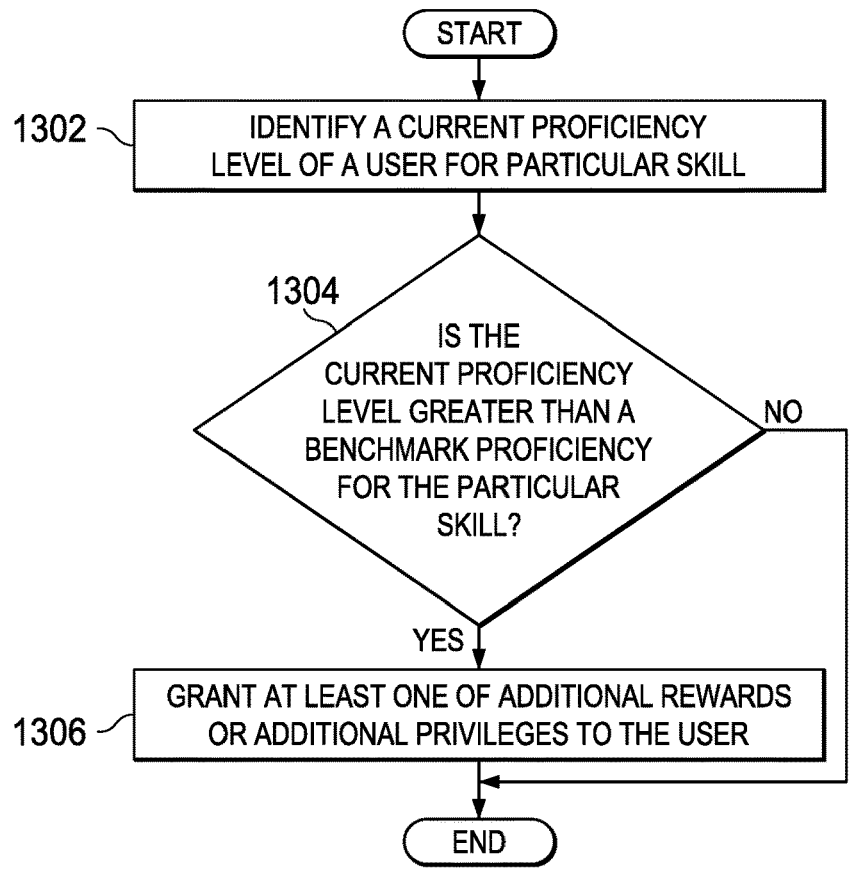
FIG. 13 is an illustration of a flowchart of a process for granting rewards and privileges based on the proficiency level in a skill in accordance with an illustrative embodiment.

Turning now to FIG. 13, an illustration of a flowchart of a process for granting rewards and privileges based on the proficiency level in a skill is depicted in accordance with an illustrative embodiment. The process illustrated in FIG. 13 may be implemented in skill training environment 100 shown in block form in FIG. 1. This process may be used to enable operations for organization 106. In particular, the process may be implemented in skill trainer 112 in computer system 116. Specifically, the process may be implemented in content manager 304, shown in block form in FIG. 4.

The process begins by identifying a current proficiency level of a user for a particular skill (step 1302). The process then determines whether the current proficiency level is greater than a benchmark proficiency for the particular skill (step 1304). In response to determining that the current proficiency level is not greater than the benchmark ("no" at step 1304), the process terminates. In response to determining that the current proficiency level is greater than the benchmark ("yes" at step 1304), the process grants at least one of additional rewards or additional privileges to the user (step 1306), the process terminating thereafter. In this manner, performing an action in the organization based on the proficiency of an employee in the particular skill is enabled.

Figure 14:
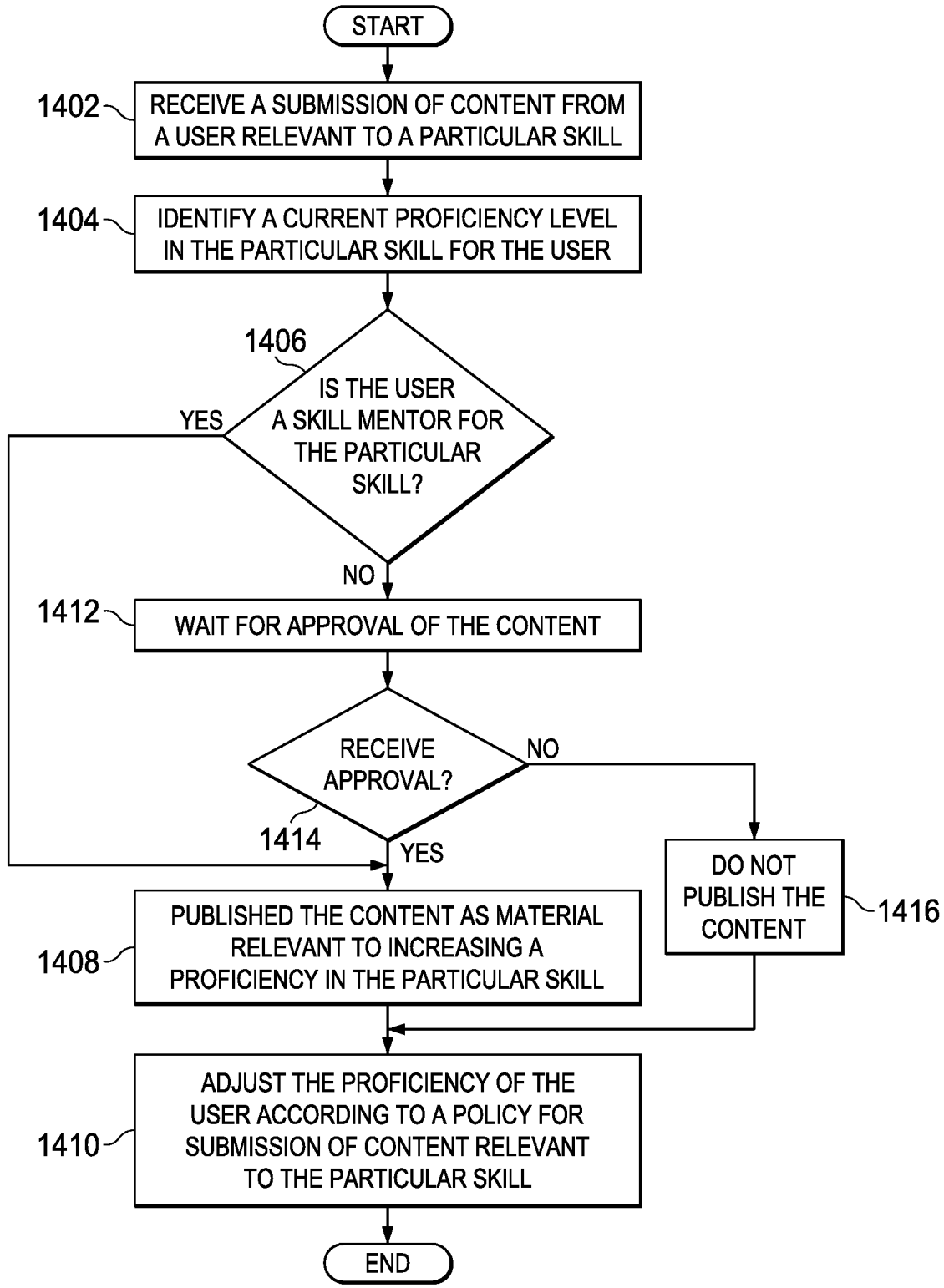
FIG. 14 is an illustration of a flowchart of a process for increasing proficiency in a skill based on peer-reviewed submissions of content in accordance with an illustrative embodiment.

Turning now to FIG. 14, an illustration of a flowchart of a process for increasing proficiency in a skill based on peer-reviewed submissions of content is depicted in accordance with an illustrative embodiment. The process illustrated in FIG. 14 may be implemented in skill training environment 100 shown in block form in FIG. 1. This process may be used to enable operations for organization 106. In particular, the process may be implemented in skill trainer 112 in computer system 116. Specifically, process may be implemented in content generator 202, shown in block form in FIG. 2, cooperating with content manager 304, shown in block form in FIG. 3.

The process begins by receiving a submission of content from a user relevant to a particular skill (step 1402). As the process then identifies a current proficiency level in the particular skill for the user (step 1404). Based on current proficiency level, the process identifies whether the user is a skill mentor for the particular skill (step 1406). Responsive to identifying the user is a skill mentor for the particular skill ("yes" at step 1406), the process then publishes the content as material relevant to increasing a proficiency in the particular skill (step 1408). The process then adjusts the proficiency of the user according to a policy for submission of content relevant to the particular skill (step 1410), with the process terminating thereafter.

Returning now to step 1406, responsive to identifying that the user is not a skill mentor for the particular skill ("no" at step 1406) the process waits for approval of the content as being relevant to increasing proficiency in the particular skill (step 1412). Responsive to receiving approval of the content ("yes" at step 1414), the process publishes the content as material relevant to increasing a proficiency in the particular skill (step 1408), and proceeds as described above.

Returning now to step 1414, responsive to not receiving approval of the content ("no" at step 1414), the process does not publish the content (step 1416). The process then adjust the proficiency of the user according to a policy for submission of content relevant to the particular skill (step 1410), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 15:
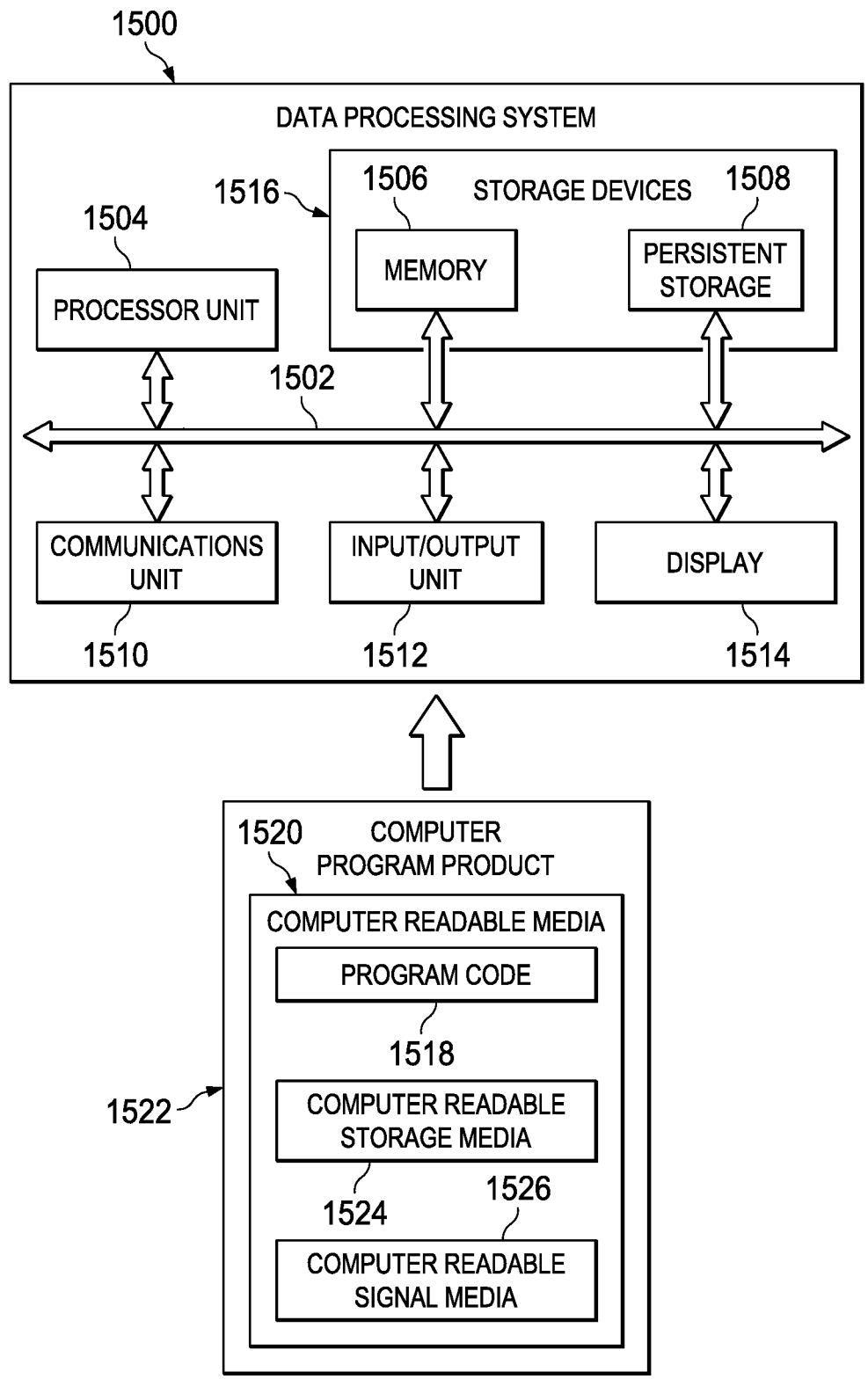
FIG. 15 is an illustration of a block diagram of a data processing system in accordance with an illustrative embodiment.

Turning now to FIG. 15, an illustration of a block diagram of a data processing system is depicted in accordance with an illustrative embodiment. Data processing system 1500 may be used to implement computer system 116 in FIG. 1. In this illustrative example, data processing system 1500 includes communications framework 1502, which provides communications between processor unit 1504, memory 1506, persistent storage 1508, communications unit 1510, input/output unit 1512, and display 1514. In this example, communications framework 1502 may take the form of a bus system.

Processor unit 1504 serves to execute instructions for software that may be loaded into memory 1506. Processor unit 1504 may be a number of processors, a multi-processor core, or some other type of processor, depending on the particular implementation.

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1516 may also be referred to as computer readable storage devices in these illustrative examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that may be connected to data processing system 1500. For example, input/output unit 1512 may provide a connection for user input through at least of a keyboard, a mouse, or some other suitable input device. Further, input/output unit 1512 may send output to a printer. Display 1514 provides a mechanism to display information to a user.

Instructions for at least one of the operating system, applications, or programs may be located in storage devices 1516, which are in communication with processor unit 1504 through communications framework 1502. The processes of the different embodiments may be performed by processor unit 1504 using computer-implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these illustrative examples. In one example, computer readable media 1520 may be computer readable storage media 1524 or computer readable signal media 1526.

In these illustrative examples, computer readable storage media 1524 is a physical or tangible storage device used to store program code 1518 rather than a medium that propagates or transmits program code 1518. Alternatively, program code 1518 may be transferred to data processing system 1500 using computer readable signal media 1526. Computer readable signal media 1526 may be, for example, a propagated data signal containing program code 1518. For example, computer readable signal media 1526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code 1518.

Thus, the illustrative examples in the different figures provide one or more technical solutions to overcome a technical problem of having amounts of information that make identifying characteristics of people more cumbersome and time-consuming than desired. For example, skill trainer 112 identifies skills from searching information in a network. The skill may be added to a group of skills when the skills are considered to be valid. The validation of the skill in these illustrative examples may be performed by comparing the evidence of the skill to a policy. If the evidence meets a policy, then the skills are considered valid and are added to a group of skills for one or more people. In this manner, in performing operations with respect to an organization, more certainty is present in making decisions to perform operations that rely on the presence of skills. In this manner, the use of skill trainer 112 has a technical effect of reducing time, effort, or both in identifying skills for people as well as in performing operations for an organization.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for training skills in an organization, the method comprising:
   providing a skill trainer comprising a hardware processor in communication with a memory, a relevancy assessor connected to statistics and a proficiency assessor comprising benchmarks, wherein the hardware processor:
   receives a submission from a user, wherein the submission comprises content that is relevant to a particular skill, as identified by the relevancy assessor;
   publishes the content to a skill training library as material relevant to increasing a proficiency of other users in the particular skill;
   increases a proficiency of the user for the particular skill according to a policy for submission of the content to the skill training library that is relevant to the particular skill using the proficiency assessor;
   identifies whether the proficiency of the user for the particular skill exceeds a benchmark for proficiency in the particular skill using the proficiency assessor; and
   responsive to identifying the proficiency of the user exceeding the benchmark for proficiency in the particular skill using the proficiency assessor:
   automatically designates the user as a skill mentor;
   automatically grants the user a plurality of additional privileges within the skill trainer with regard to feedback based on submission of positive feedback; and
   automatically grants administrative privileges over additional content submitted by other users who are different than the user, wherein the additional content is different than the content and the administrative privileges include at least one of review of content, approval of content, deletion of content, or content feedback; and
   using the skill trainer to perform operations for the organization implemented in the skill trainer automatically in at least one of a content manager, a program manager and a content generator based on the proficiency of the user for the particular skill, wherein the operations are selected from at least one of employee hiring, employee benefits administration, employee payroll, employee performance reviews, forming teams of employees for new products, or assigning research projects to employees.

2. The method of claim 1, wherein the content is selected from at least one of a PDF file relevant proficiency in the particular skill, a PPT file relevant proficiency in the particular skill, a word processor document relevant proficiency in the particular skill, a link to a publications relevant proficiency in the particular skill, a link to a video relevant proficiency in the particular skill, or a link to a podcast relevant proficiency in the particular skill.

3. The method of claim 1, wherein the user is a first user, and the method further comprises:
   the hardware processor identifying an action performed by a second user with respect to the content.

4. The method of claim 3, further comprising:
   in response to identifying the action performed by the second user with respect to the content, the hardware processor increasing a proficiency of the second user for the particular skill according to a policy for interacting with the content relevant to the particular skill.

5. The method of claim 3, further comprising:
   in response to identifying the action performed by the second user with respect to the content, the hardware processor modifying a proficiency of the first user for the particular skill according to a policy for interacting with the content relevant to the particular skill, wherein the action with respect to the content includes at least one of submitting the content, accessing the content, or providing feedback on the content.

6. The method of claim 5, wherein a step of increasing the proficiency of the second user further comprises:
the hardware processor increasing the proficiency of the second user for the particular skill according to feedback received from the first user about the content.

7. The method of claim 1, further comprising:
in response to receiving the submission, the hardware processor generating a tag associated with the content, wherein the tag specifies that the content is relevant to the particular skill.

8. The method of claim 1, further comprising:
in response to identifying the proficiency of the user exceeding the benchmark for proficiency in the particular skill, the content manager granting the user an additional reward wherein the additional reward includes a designation.

9. The method of claim 8, wherein the additional reward comprises designation of the user as a skill mentor.

10. A computer system comprising:
a processor unit;
a memory in communication with the processor unit; and
a skill trainer implemented by the processor unit and the memory, the skill trainer comprising a relevancy assessor connected to statistics and a proficiency assessor comprising benchmarks, wherein the skill trainer is for training skills in an organization, and the skill trainer is configured to:
receive a submission from a user, the submission comprising content that is relevant to a particular skill, as identified by the relevancy assessor;
publish the content as material relevant to increasing proficiency in the particular skill;
increase a proficiency of the user for the particular skill according to a policy for submission of the content relevant to the particular skill using the proficiency assessor;
identify whether the proficiency of the user for the particular skill exceeds a benchmark for proficiency in the particular skill using the proficiency assessor; and
responsive to identifying that the proficiency of the user exceeds the benchmark for proficiency in the particular skill using the proficiency assessor:
automatically designate the user as a skill mentor;
automatically grants the user a plurality of additional privileges within the skill trainer with regard to feedback based on submission of positive feedback; and
automatically grant administrative privileges to the user over additional content submitted by other users who are different than the user, wherein the additional content is different than the content and the administrative privileges comprise at least one of review of content, approval of content, deletion of content, or content feedback; and
enable a performance of operations for an organization implemented in the skill trainer automatically in at least one of a content manager, a program manager and a content generator based on the proficiency of the user in the particular skill, wherein the performance of operations is selected from at least one of hiring, benefits administration, payroll, human resource performance reviews, forming teams for new products, or assigning research projects.

11. The computer system of claim 10, wherein the content is selected from at least one of a PDF file relevant proficiency in the particular skill, a PPT file relevant proficiency in the particular skill, a word processor document relevant proficiency in the particular skill, a link to a publications relevant proficiency in the particular skill, a link to a video relevant proficiency in the particular skill, or a link to a podcast relevant proficiency in the particular skill.

12. The computer system of claim 10, wherein the user is a first user, and the skill trainer being is further configured to:
identify an action performed by a second user with respect to the content.

13. The computer system of claim 12, wherein the skill trainer is further configured to:
in response to identifying the action performed by the second user with respect to the content, increase a proficiency of the second user for the particular skill according to a policy for interacting with the content relevant to the particular skill.

14. The computer system of claim 12, wherein the skill trainer is further configured to:
in response to identifying the action performed by the second user with respect to the content, modify a proficiency of the first user for the particular skill according to a policy for interacting with the content relevant to the particular skill, wherein the action with respect to the content includes at least one of submitting the content, accessing the content, or providing feedback on the content.

15. The computer system of claim 14, wherein increasing a proficiency of the second user further comprises:
increasing the proficiency of the second user for the particular skill according to feedback received from the first user about the content.

16. The computer system of claim 10, wherein the skill trainer is further configured to:
in response to receiving the submission, generate a tag associated with the content, wherein the tag specifies that the content is relevant to the particular skill.

17. The computer system of claim 10, wherein the skill trainer is further configured to:
in response to identifying that the proficiency of the user exceeds the benchmark for proficiency in the particular skill, using the content manager to grant the user an additional reward wherein the additional reward includes a designation.

18. The computer system of claim 17, wherein the additional reward comprises designation of the user as a skill mentor.

19. A computer program product comprising:
a computer readable storage media including instructions that are executable by a hardware processor, wherein the instructions are for training skills in an organization, and the instructions comprise:
first program code for receiving a submission from a user, wherein the submission comprises content that is relevant to a particular skill, as identified by a relevancy assessor connected to statistics;
second program code for publishing the content as material relevant to increasing proficiency in the particular skill;
third program code for increasing a proficiency of the user for the particular skill according to a policy for submission of the content relevant to the particular skill using a proficiency assessor comprising benchmarks;

fourth program code for identifying whether the proficiency of the user for the particular skill exceeds a benchmark for proficiency in the particular skill using the proficiency assessor;

fifth program code for, responsive to identifying that the proficiency of the user exceeds the benchmark for proficiency in the particular skill using the proficiency assessor:

automatically designating the user as a skill mentor;

automatically grants the user a plurality of additional privileges within a skill trainer with regard to feedback based on submission of positive feedback, the skill trainer comprising a hardware processor in communication with a memory, the relevancy assessor and the proficiency assessor; and automatically granting administrative privileges to the user, wherein the administrative privileges are over additional content submitted by other users who are different than the user, and wherein the additional content is different than the content and the administrative privileges include at least one of review of content, approval of content, deletion of content, or content feedback; and sixth program code, in response to identifying that the proficiency of the user exceeds the benchmark for proficiency in the particular skill using the proficiency assessor, for enabling operations for an organization implemented in the skill trainer automatically in at least one of a content manager, a program manager and a content generator based on reliance on the proficiency of the user for the particular skill, wherein the operation is selected from at least one of hiring, benefits administration, payroll, human resource performance reviews, forming teams for new products, or assigning research projects.

20. The computer program product of claim 19, wherein the content is selected from at least one of a PDF file relevant proficiency in the particular skill, a PPT file relevant proficiency in the particular skill, a word processor document relevant proficiency in the particular skill, a link to a publications relevant proficiency in the particular skill, a link to a video relevant proficiency in the particular skill, and a link to a podcast relevant proficiency in the particular skill.

21. The computer program product of claim 19, wherein the user is a first user, and the instructions further comprise:

seventh program code for identifying an action performed by a second user with respect to the content.

22. The computer program product of claim 21, wherein the instructions further comprise:

eighth program code for increasing a proficiency of the second user for the particular skill according to a policy for interacting with the content relevant to the particular skill in response to identifying the action performed by the second user with respect to the content.

23. The computer program product of claim 21, wherein the instructions further comprise:

eighth program code for modifying a proficiency of the first user for the particular skill according to a policy for interacting with the content relevant to the particular skill in response to identifying the action performed by the second user with respect to the content, wherein the action with respect to the content includes at least one of submitting the content, accessing the content, or providing feedback on the content.

24. The computer program product of claim 23, wherein the eighth program code further comprises:

ninth program code for increasing a proficiency of the second user for the particular skill according to feedback received from the first user about the content.

25. The computer program product of claim 19, wherein the instructions further comprise:

seventh program code for generating a tag associated with the content in response to receiving the submission, wherein the tag specifies that the content is relevant to the particular skill.

26. The computer program product of claim 19, wherein the instructions further comprise:

seventh program code for granting the user using the content manager an additional reward including a designation in response to identifying that the proficiency of the user exceeds the benchmark for proficiency in the particular skill.

27. The computer program product of claim 26, wherein the additional reward comprises designation of the user as a skill mentor.

* * * * *